Nov. 24, 1931.  T. P. CHASE  1,833,413
BRAKE DRUM
Filed Jan. 23, 1930

Inventor
Theron P. Chase
By Blackmore, Spencer & Finch
Attorneys

Patented Nov. 24, 1931

1,833,413

UNITED STATES PATENT OFFICE

THERON P. CHASE, OF DETROIT, MICHIGAN, ASSIGNOR TO GENERAL MOTORS RESEARCH CORPORATION, OF DETROIT, MICHIGAN, A CORPORATION OF DELAWARE

BRAKE DRUM

Application filed January 23, 1930. Serial No. 422,797.

This invention relates to brake drums of the type used in motor vehicles, and more particularly to means for eliminating objectionable sounds caused by vibration of the drums. It has been found that under certain conditions, when the brake is applied there is a tendency for the brake lining to stick to the drum, thus causing a chattering sound as it alternately adheres to and is released from the drum. This sound is amplified by the shape of the drum and is, of course, very undesirable since in the construction of the modern motor vehicle every effort is being made to eliminate all unnecessary sounds.

An object of this invention is to prevent the occurrence of such sounds by preventing vibration of the drum. This may be accomplished in several ways, such as by holding a pad or strip of non-metallic or resilient material against the drum which will serve to damp the vibrations as they tend to occur, and thus prevent the chattering sound from taking place.

Another object is to so construct the means for preventing vibration of the drum that it will serve the additional function of bracing the drum against deflection in an axial direction when the pressure of the brake shoes against the drum becomes unbalanced.

Other objects and advantages will be apparent upon referring to the specification and accompanying drawings, in which.

Figures 1, 2, 3:
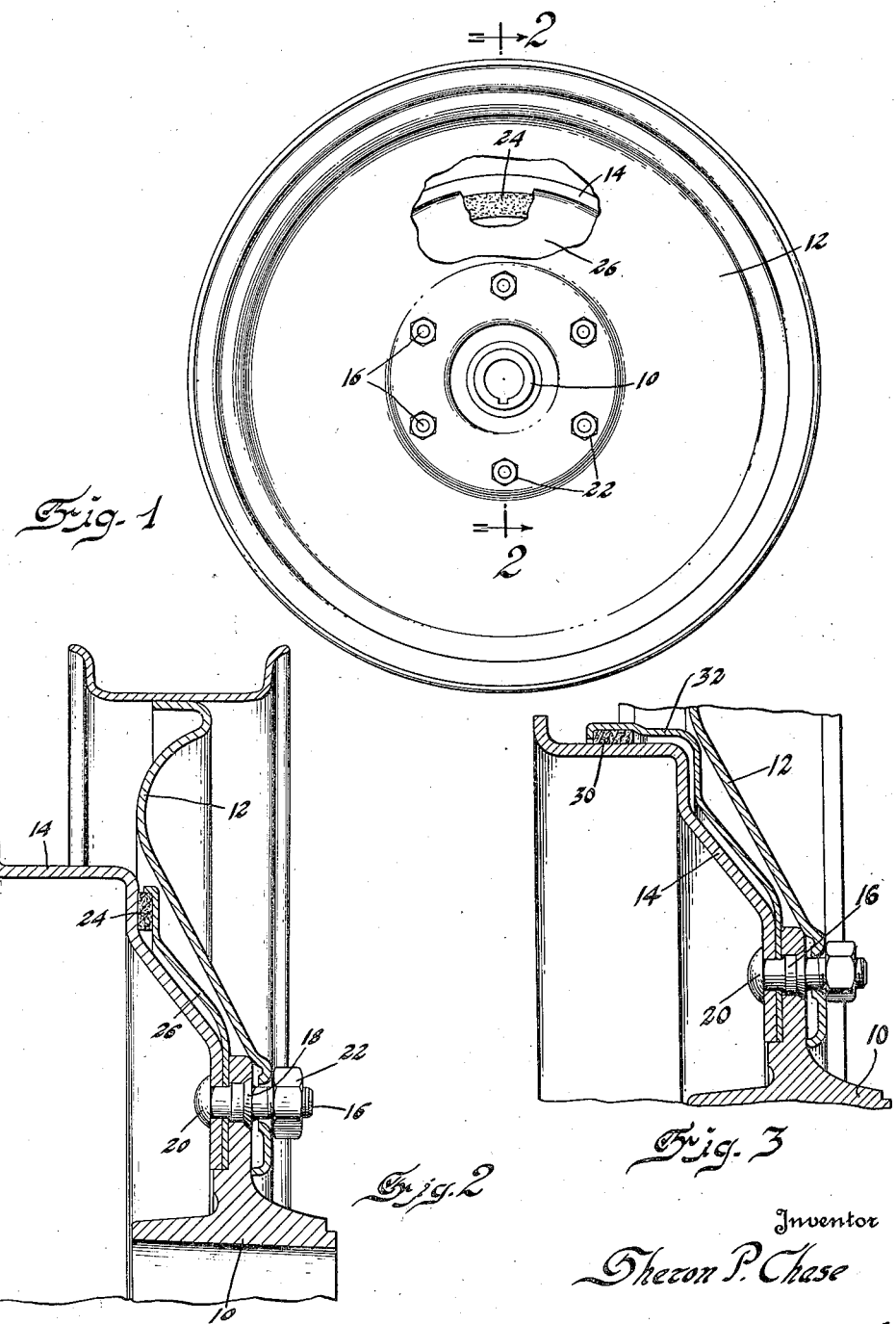
Figure 1 is a side view of a vehicle wheel, with parts broken away to show my improved vibration preventing means associated therewith.
Figure 2 is a section taken on line 2—2 of Figure 1.
Figure 3 is a view corresponding to Figure 2 but having a modified form of construction.

The reference numeral 10 indicates a wheel hub upon which is mounted a wheel supporting disc 12 and a brake drum 14. The brake drum is secured to the hub by means of bolts 16 upon which are formed shoulders 18 which engage the hub 10. After the brake drum has been mounted in position upon the hub, the inner ends of the bolts 16 are riveted over, as at 20, to securely hold the brake drum in place upon the hub. Nuts 22, in threaded engagement with the bolts 16, serve to hold the disc 12 in proper position upon the hub.

Under certain conditions, when the brakes are applied, the friction material tends to seize the revolving drum, and, since it cannot rotate with the latter, it breaks loose and seizes again in rapid succession, thus causing the drum to vibrate as a result of the chattering action of the lining against the drum, and thereby producing a very noticeable and objectionable sound.

In order to prevent this, I propose to hold a piece of resilient or non-metallic material 24 against the brake drum, which will serve to prevent the drum from vibrating. It is a well recognized fact that any object may be prevented from vibrating by placing some other object in contact with it, this contact preventing the vibration which in turn produces sound.

The resilient material 24 may be held against any portion of the drum for this purpose, but I prefer to hold it against the web portion. It may be held in any suitable manner, such as by the annular member 26 shown in the drawings. This member is clamped between the hub 10 and the drum 14 before assembly of the latter upon the hub. The dimensions of the member 26 are such that, as the brake drum is drawn down against the member 26 by the action of riveting over the heads of the bolts 16, the resilient material 24 will be tightly clamped between the member 26 and the drum 14. The pressure of the resilient material against the drum is consequently great enough to substantially prevent vibration of the drum, and consequently no sound is produced.

In Figure 3, resilient material 30 is shown as being held against the flange portion of the drum by means of a sheet metal member 32 which is secured between the hub 10 and the brake drum 14 by the bolts 16 which are riveted over, similar to the construction illustrated in Figure 2. The member 32 is so proportioned that it must be slightly sprung outwardly when the brake drum is assembled inside the resilient material 30, in order that the latter will be firmly held against the flange of the drum at all times.

Since in both of the illustrated forms of the invention, the resilient material is pressed against the drum, it will be readily seen that it will serve to reinforce or brace the latter, and will thereby prevent the drum from becoming cocked relative to the axis of the wheel if the pressure of the brake shoes should become greater on one side than on the other. This is very advantageous since it still further reduces the possibility of noise being created by the brakes as it prevents "squealing" sounds caused by the brake drum becoming out of true.

It is thought from the foregoing, taken in connection with the accompanying drawings, that the construction and operation of the device will be apparent to those skilled in the art, and that various changes in size, shape and location of the parts may be made without departing from the spirit and scope of the appended claims.

I claim:

1. In combination with a brake drum having a web and flange portions, means cooperating with said web portion for the purpose of damping vibration of said drum.

2. In combination with a brake drum having a web and flange portions, non-metallic means held against said web portion for the purpose of preventing vibration of said drum.

3. In combination with a brake drum having a web and flange portions, a resilient member held against said web portion for the purpose of damping vibration of said drum.

4. In combination with a brake drum and a wheel hub upon which the brake drum is mounted, a resilient member, and means secured between the hub and drum serving to hold said member against the drum for the purposes specified.

5. In combination with a brake drum having web and flange portions and a wheel upon which the brake drum is supported, a resilient member, and means secured to the wheel serving to hold said resilient member against the flange portion of the drum for the purpose of damping vibration of said drum.

6. In combination with a brake drum having web and flange portions and a wheel hub upon which the brake drum is supported, a resilient member, and means secured to the hub serving to hold said resilient member against the flange portion of the drum for the purpose of damping vibration of said drum.

In testimony whereof I affix my signature.

THERON P. CHASE.